UNITED STATES PATENT OFFICE.

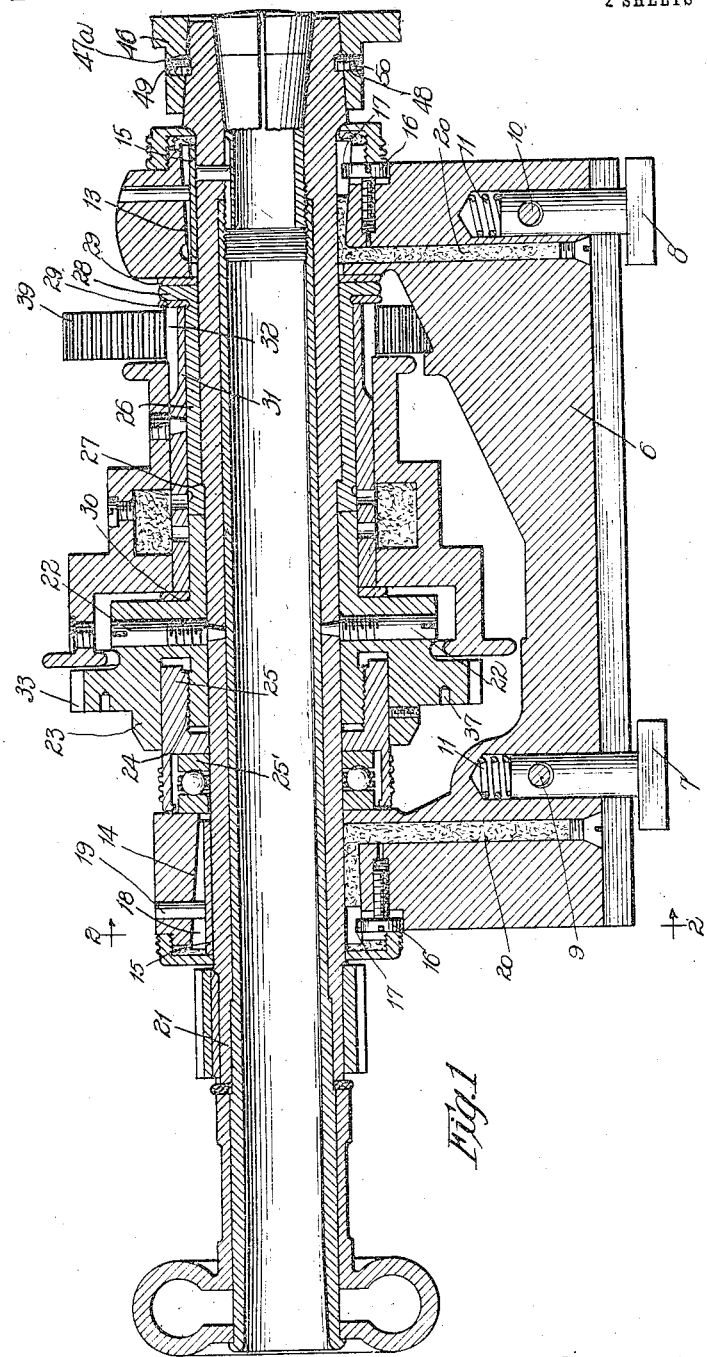

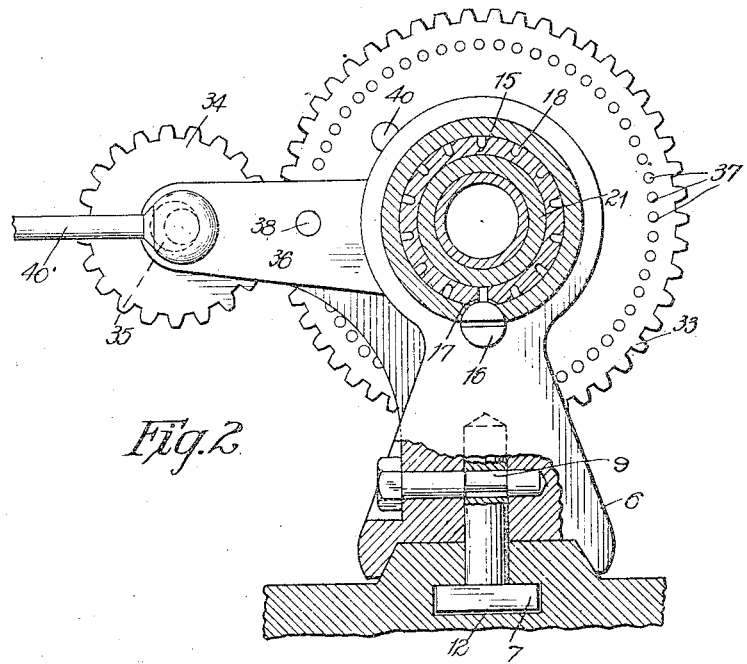
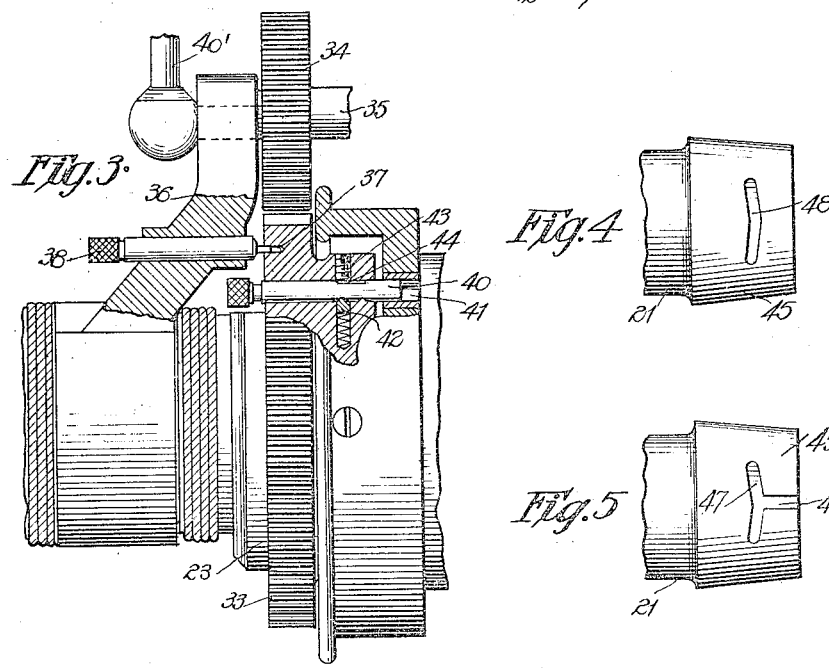

FRANKLIN HARDINGE, OF CHICAGO, ILLINOIS, ASSIGNOR TO HARDINGE BROTHERS, OF CHICAGO, ILLINOIS, A CORPORATION OF ILLINOIS.

LATHE HEAD-STOCK.

1,252,346.  Specification of Letters Patent.  Patented Jan. 1, 1918.

Original application filed January 28, 1915, Serial No. 4,841. Divided and this application filed April 8, 1916. Serial No. 89,751.

*To all whom it may concern:*

Be it known that I, FRANKLIN HARDINGE, a citizen of the United States, residing at Chicago, in the county of Cook and State of Illinois, have invented a certain new and useful Improvement in Lathe Head-Stocks, of which the following is a full, clear, concise, and exact description, reference being had to the accompanying drawings, forming a part of this specification.

My invention relates to lathes and has for its object the provision of an improved lathe head stock wherein the end shake of the cone pulley and the end shake of the spindle are entirely independent so that the cone pulley is free to vibrate independently of the spindle and thus insure steadiness of the spindle and the work carried thereby when accuracy is an important element. This application is a division of my co-pending application Serial No. 4,841, filed January 28, 1915.

In carrying out the objects of my invention I provide a head stock containing the usual front and rear bearings in which is journaled the spindle. An end thrust plate is secured to the spindle and acts against an end thrust bearing positioned between it and the front face of the rear bearing of the head stock. The end thrust of the spindle is thus taken up by the thrust plate and the bearing. Mounted around the spindle between the front and rear bearings of the head stock and arranged to have certain longitudinal movement relative to the spindle I provide a cone pulley which may, if desired, be connected with the spindle or the thrust plate so as to rotate therewith.

My invention finds particular utility in a lathe head stock wherein back gearing is employed to cause the spindle to rotate at a different speed than the speed of the pulley. In this construction the end thrust plate can conveniently form one of a pair of gears mounted on the spindle for obtaining the desired gear ratio between the cone pulley and the spindle. Adjusting means is provided between the thrust plate and the end thrust bearing so that any end shake of the spindle may be easily and quickly taken up. A further object of my invention is the provision of means for locking a face plate of the class described in my Patent No. 894,635 to the lathe spindle so that accidental displacement thereof is prevented.

These and other features of my invention will be more clearly pointed out in connection with the accompanying drawings wherein—

Figure 1 is a vertical sectional view of the head stock of my invention illustrating a portion of a face plate secured to the spindle.

Fig. 2 is a cross-sectional view taken through the lines 2—2 of Fig. 1 looking in the direction indicated by the arrows.

Fig. 3 is a fragmentary plan view of the end thrust plate and the means for locking it to the cone pulley.

Fig. 4 is a detail view of the locking slot provided in the spindle for locking the face plate thereto; and Fig. 5 is a view similar to Fig. 4 showing the slot in the spindle which permits removal of the face plate when the locking pin is removed.

Similar characters of reference refer to similar parts throughout the several views.

Referring first to Fig. 1, 6 illustrates the base or frame of the head stock which may be secured to the bed of the lathe by means of the clamping members 7 and 8 which are operated by the eccentrics 9 and 10. The springs 11 normally tend to move the locking members 7 and 8 downwardly. The members 7 and 8 fit into the T-shaped slot 12 and are arranged when the eccentrics 9 and 10 are moved upwardly to clamp the under side of the lathe bed, as illustrated in Fig. 2. The base or frame 6 extends upwardly and has formed therein the front and rear bearings 13 and 14 respectively. Bushings are provided in these bearings as illustrated at 15 and are held in position by means of the adjustable screws 16. The screws 16 extend into grooves 17 so that longitudinal movement of the bushings is dependent upon the adjusting screws. The bushings may be grooved as illustrated at 18 and held against angular movement by means of the pins 19 extending through the frame. A lubricating wick 20 may be employed to lubricate the wearing surfaces of the front and rear bearings. Rotatably mounted within the bushings 15 is the spindle 21 to which is secured by means of the screws 22 the end thrust plate 23. This thrust plate is externally threaded at 24 to receive the adjusting nut 25. The rear end of the adjusting nut abuts against the end thrust ball bearing 25', having its rear face lying against the front face of the rear frame bearing. From the construction thus far described it will be seen that the end thrust of the spindle is taken up by the ball bearing 25' and that the end shake of the spindle can be taken up by the adjusting nut 25.

Mounted around the spindle and positioned between the end thrust member 23 and the front bearing is a sleeve 26 provided with a shoulder 27 resting against a corresponding shoulder provided on the spindle. This sleeve extends outwardly at 28 and has mounted on each side of it a resilient spacing washer 29. A similar resilient spacing washer 30 is provided between the cone pulley and the end thrust member. Mounted around the sleeve 26 and a portion of the end thrust member is a second sleeve 31 cut away at 32 to form a pinion. This sleeve is connected with the cone pulley, as illustrated, so as to rotate therewith. The spacing washers 29 and 30 are of a size such as to permit certain longitudinal play of the cone pulley and thus avoid the transmission of end shake from the pulley to the spindle.

The end thrust member 23 extends outwardly to form a gear 33 arranged to cooperate with a gear 34 mounted upon an eccentric shaft 35 journaled in the rearwardly extending brackets 36 of the frame. The member 23 may also be provided with apertures 37, preferably sixty in number, to facilitate the cutting of double, triple, or more threads. The apertures 37 are arranged to contain a pin 38 carried by the bracket 36. In cutting double or more threads it is necessary to rotate the head spindle a certain amount ahead of the carriage feed mechanism, the amount of rotation depending upon the number of threads to be cut upon the work. If the work is to contain double threads connection between the head stock and the carriage feed mechanism is discontinued and the head spindle rotated 180°, or thirty apertures, if the end thrust plate contains sixty apertures. The pin 38 is then inserted into the aperture marked 30 and connection again made between the head stock spindle and the carriage. After the work is thus rotated ahead of the carriage the pin 38 is again removed.

The eccentric shaft 35 also has mounted upon it a gear 39 which meshes with a pinion 32 when the shaft is rotated substantially 180° from the position illustrated in Fig. 2 by means of the handle 40'. When the pinion 32 and gear 33 are connected by means of the gears 34 and 39 the spindle will be caused to rotate at a different speed than the cone pulley. In this case the spindle will rotate at a lower rate of speed. If it is desired to have the spindle rotate in unison with the cone pulley the pulley and spindle are directly connected with each other. This can be easily done by means of a plunger 40 carried by the end thrust member 23 arranged when moved to the position illustrated in Fig. 3 to extend into an aperture 41 contained in the cone pulley. A detent may be employed at 42 to retain the plunger in operative or inoperative position and to prevent angular movement of the plunger a projection 43 may be arranged to extend into a longitudinal slot 44 in the plunger. Attention is called to the fact that so far as end shake is concerned the cone pulley is in no way connected with the end thrust plate. Even if the plunger 40 connects the thrust plate with the pulley the pulley is allowed a certain longitudinal vibration independent of the spindle, the plunger serving merely to angularly connect the pulley with the spindle.

Fig. 5 illustrates the slot contained in the front end of the spindle which is tapered at 45 for receiving a pin carried by the face plate 46 shown in Fig. 1. This construction is described and illustrated in the patent above mentioned and I shall not, therefore, go into the description in detail. It will suffice to say here that the pin of the face plate extends into the spiral slot 47 and is caused when the spindle is rotated and a load placed upon the face plate to move rearwardly and thus tightly secure the plate to the nose of the spindle. The face plate is provided with a tapered bore to correspond with the spindle nose.

I find that in some instances the face plate works itself out of the slot 47 when the rotation of the lathe spindle is suddenly stopped, the momentum developed in the work and the face plate serving to force the plate ahead of the spindle and toward the longitudinal portion of the slot 47ª. When the pin is in alinement with this slot 47ª it is very easy to accidentally remove the plate from the spindle. To prevent this undesirable feature I provide a second spiral slot 48 which is preferably disposed on the nose of the spindle about 180° away from the slot 47. This slot is substantially the same in conformation as the slot 47, except that it does not contain the longitudinal portion extending to the end of the spindle. When the face plate is placed in position on the spindle with the screw projection 49 extending into the slot 47 a second projection is inserted at 50 into the spiral slot 48. The removal of the face plate is thus entirely prevented until the projection 50 is removed.

Having thus described my invention what I claim as new and desire to secure by Letters Patent of the United States is:

1. A lathe head stock comprising a frame, a spindle journaled therein, an end thrust bearing between the spindle and the frame, and a cone pulley rotatably mounted on the spindle and having relative longitudinal movement thereon.

2. A lathe head stock comprising a frame, a spindle journaled therein, and a cone pulley mounted on the spindle so as to have certain longitudinal movement relative thereto to prevent end shake of the spindle through the pulley.

3. A lathe head stock comprising a frame, a spindle journaled therein, an end thrust bearing between the spindle and the frame, and a cone pulley mounted on the spindle and having relative longitudinal movement thereon.

4. A lathe head stock comprising a frame, a spindle journaled therein, an adjustable end thrust bearing between the spindle and the frame, and a cone pulley mounted on the spindle and having relative longitudinal movement thereon.

5. In a lathe the combination with front and rear bearings, of a lathe spindle disposed in said bearings, a cone pulley mounted on the spindle and having relative longitudinal movement thereon, a pinion connected therewith, a gear carried by the spindle, intermediate gears connecting said gear and pinion, an end thrust ball bearing mounted on the spindle between said gear and rear bearing, and a pin disposed parallel to the spindle for connecting the pulley and spindle to rotate together, but permitting longitudinal movement of either independently of the other.

6. In a lathe the combination with front and rear bearings of a lathe spindle disposed in said bearings, a cone pulley mounted on the spindle and having relative longitudinal movement thereon, a pinion connected therewith, a gear carried by the spindle, intermediate gears connecting said gear and pinion, an end thrust ball bearing mounted on the spindle between said gear and rear bearing, end shake adjusting means between said gear and said ball bearing, and a pin carried by the gear and lying parallel to the spindle for connecting the gear and cone pulley but permitting longitudinal movement of either independently of the other.

7. In a lathe the combination with front and rear bearings of a lathe spindle disposed in said bearings, a bearing sleeve mounted on said spindle between the bearings and provided with a pinion, a cone pulley fixed to the sleeve, said sleeve having longitudinal movement relatively to the spindle, a gear carried by said spindle, intermediate gears connecting said pinion and gear, an end thrust ball bearing positioned between said gear and rear bearing, end shake adjusting means between the gear and the ball bearing, and a pin carried by the gear and lying parallel to the spindle for connecting the gear and cone pulley but permitting longitudinal movement of either independently of the other.

8. In a lathe the combination with a driving supporting member in the form of a tapered spindle of a driven member having a tapered bore to fit the driving member, a slot in the engaging surface of one of said members extending from the edge thereof, said slot being longitudinal and then spiral, a projection on the other member for engaging in said slot, a locking slot in the engaging surface of one of said members and a locking projection coöperating with said slot carried by the other of said members.

9. In a lathe the combination with a driving supporting member in the form of a tapered spindle of a driven member having a tapered bore to fit the driving member, a slot in the engaging surface of one of said members extending from the edge thereof, said slot being longitudinal and then spiral, a projection on the other member for engaging in said slot, a spiral locking slot in the engaging surface of one of said members and a locking projection coöperating with said slot carried by the other of said members.

In witness whereof, I hereunto subscribe my name this 24th day of March, A. D. 1916.

FRANKLIN HARDINGE.

Witnesses:
MARY A. COOK,
H. A. NEIBURGER.